United States Patent
Anibas

(12) United States Patent (10) Patent No.: US 6,899,193 B1
Anibas (45) Date of Patent: May 31, 2005

(54) MOTORCYCLE LATERAL SUSPENSION MECHANISM

(76) Inventor: Kevin J. Anibas, 2136 4th St., Eau Claire, WI (US) 54703

( * ) Notice: Subject to any disclaimer, the term of this patent is extended or adjusted under 35 U.S.C. 154(b) by 0 days.

(21) Appl. No.: 10/781,958

(22) Filed: Feb. 20, 2004

(51) Int. Cl.[7] ............................................. B62K 25/04
(52) U.S. Cl. ..................................... 180/227; 280/284
(58) Field of Search ................................. 280/283–285, 280/266, 281.1; 180/219, 227

(56) References Cited

U.S. PATENT DOCUMENTS

| | | | |
|---|---|---|---|
| 4,398,741 A * | 8/1983 | Hiramatsu | 280/283 |
| 4,650,023 A * | 3/1987 | Matsuda et al. | 180/219 |
| 4,756,547 A * | 7/1988 | Trema | 280/276 |
| 5,014,808 A * | 5/1991 | Savard et al. | 180/219 |
| 5,133,223 A * | 7/1992 | Morri | 74/496 |
| 5,361,864 A * | 11/1994 | Tanaka | 180/219 |
| 5,445,443 A * | 8/1995 | Hauser et al. | 303/137 |
| 5,485,893 A * | 1/1996 | Summers | 180/219 |
| 5,487,443 A | 1/1996 | Thurm | |
| 5,782,313 A * | 7/1998 | Kurawaki et al. | 180/219 |
| 5,785,141 A | 7/1998 | Breitkreutz et al. | |
| 5,845,728 A * | 12/1998 | Itoh et al. | 180/219 |
| 6,123,165 A | 9/2000 | Smith | |
| 6,263,994 B1 | 7/2001 | Eitel | |
| 6,378,644 B1 | 4/2002 | Brown et al. | |
| 2002/0074771 A1 | 6/2002 | Parigian | |
| 2002/0130486 A1 | 9/2002 | Parigian | |
| 2003/0217881 A1 | 11/2003 | Domenicali et al. | |

* cited by examiner

*Primary Examiner*—Avraham Lerner
(74) *Attorney, Agent, or Firm*—Tipton L. Randall

(57) ABSTRACT

A device for providing adjustable, deployable, controlled flex and lateral suspension movement to a motorcycle chassis. This is accomplished by a swingarm pivot mechanism, that when operated, variably allows the swingarm member to move laterally, controlled by flexure members, and constrained within selected limits. The mechanism is controlled by a logic unit acting on inputs such as lean angle, road speed, transmission gear position, engine speed, throttle position, brake application, suspension position, and a rider override switch. In another embodiment, the mechanism is used without an actuator, and is manually adjusted for flex and performance per conditions and rider preference.

21 Claims, 14 Drawing Sheets

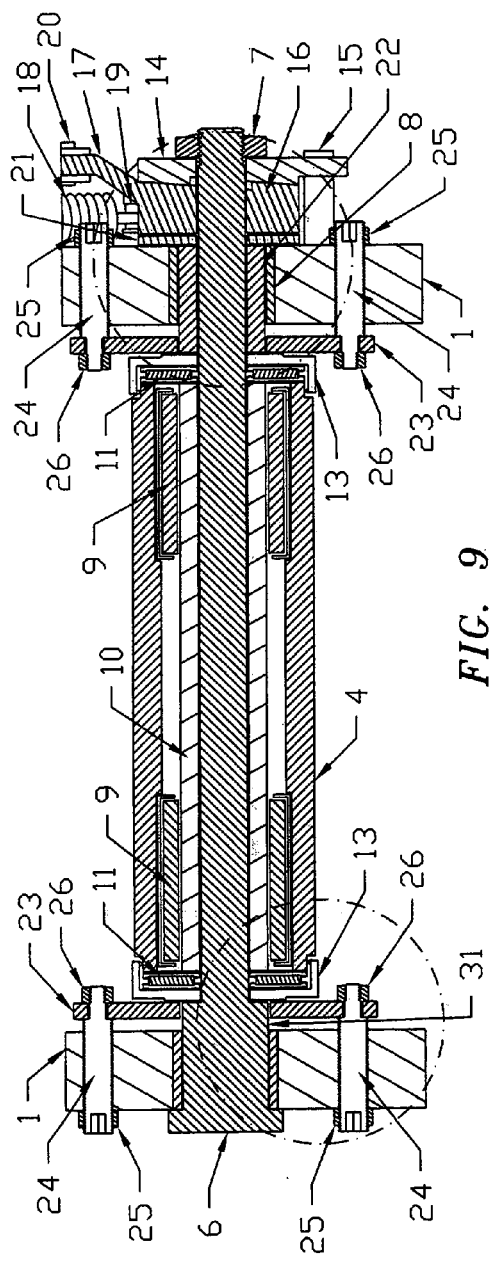
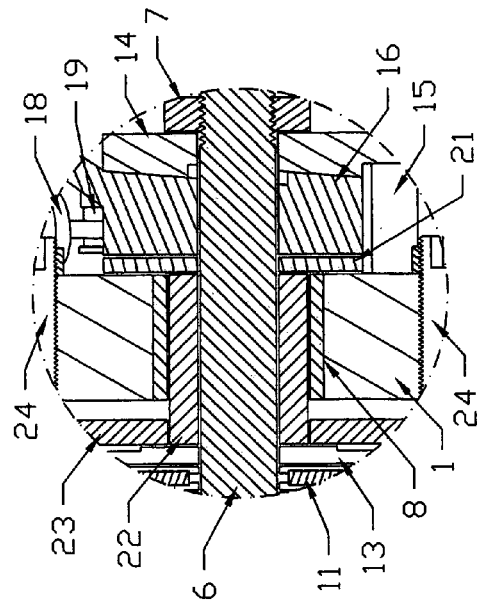
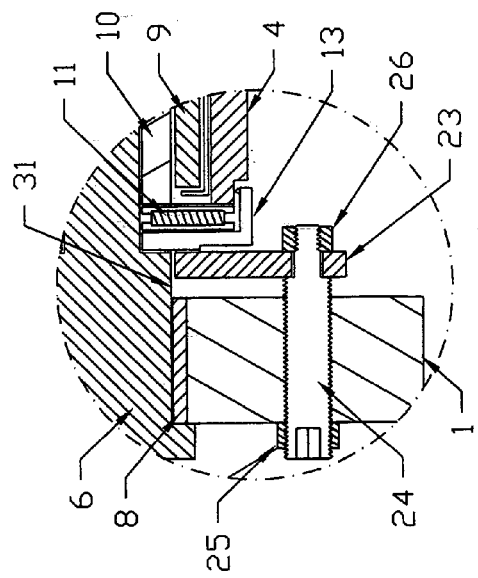

MOTORCYCLE LATERAL SUSPENSION MECHANISM

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention is a device for providing deployable, adjustable, controlled flex and lateral suspension movement to a motorcycle chassis.

2. Background Information

This invention is a device for providing deployable, adjustable, controlled flex and lateral suspension movement to a motorcycle chassis for the purpose of enhancing handling characteristics when leaned-over, and at slower speeds, but without compromising stability when the motorcycle is upright, and at high speeds.

Over the last twenty years or so, advances in motorcycle chassis and tire design have delivered great improvements in handling characteristics, especially with respect to high-speed stability. Unlike earlier chassis designs, which were often flexible to the point that dangerous instability would surface at any elevated speed, modern performance oriented motorcycles remain generally stable in most situations. While motorcycling has clearly benefitted from these advancements in frame, suspension, and tire technology, one area that arguably needs more attention is that of leaned-over traction and rider "feel." Many earlier flex-prone designs, while often frightening at elevated speeds and when mostly upright, generally remained more-or-less stable and offered good "feel" and compliance to surface irregularities when leaned-over, as when cornering. While the older "flexible" chassis absorbed some of the energy of a bump, the newer "rigid" chassis cannot. The modern chassis are rigid to the point that when leaned-over, irregularities in the road surface sometimes deflect the tires in an arc about the center of mass of the machine, resulting in a loss of traction. One might expect the suspension to absorb this bump energy, but this is not always possible. Looking at the forces acting on the motorcycle offers insight as to why very rigid chassis don't always perform as well as they might. As illustrated in drawing FIGS. 1 and 2, the bump force which acts on the suspension when leaned-over, as when cornering, is a portion of that which acts on the suspension when the motorcycle is upright. Additionally, centrifugal force tends to pre-load the suspension when cornering, making the suspension effectively stiffer. Some increase in friction in the telescopic front fork may also be present when cornering, as it is loaded at an angle to its normal plane of operation. In essence, when cornering, a lesser force is available to act on suspension that is less likely to be moved by that force. Because of this, in some cases, when an irregularity in the road surface is encountered, the tires may leave the road surface or be unloaded to the point that they lose traction. This can result in chatter, instability, or even momentary "high-side" crash inducing losses of traction. Since the suspension must accommodate braking dive forces, stability, comfort, and cornering clearance constraints, softer springs and modified damping are not a viable option to deal with this lessened force. A fully active suspension system may be an answer to this problem, but complexity and power requirements make it impractical at present. It is apparent that some chassis flex or lateral suspension movement can be beneficial to handling in some situations, and detrimental in others.

Applicant has invented a lateral suspension device, which provides deployable, adjustable, controlled flex and lateral suspension movement to a motorcycle chassis. The amount of deflection and the force required to initiate the deflection is adjustable. The device may be deployed as desired per rider preference and conditions. In two embodiments, the device is actuated automatically per inputs to a programmable logic unit. A third embodiment is manually adjusted.

SUMMARY OF THE INVENTION

The invention is a device for providing deployable, adjustable, controlled flex and lateral suspension movement to a motorcycle chassis. The device consists of a swingarm pivot mechanism, which is capable of providing multiple levels of lateral deflection to the swingarm member. Generally, the device is fully activated when the motorcycle is fully leaned-over and at lower speeds and inactivated when the motorcycle is upright and traveling at very high speeds. Preferably, the device is partially activated dependent on the speed, lean angle, and other factors. Acting on inputs such as lean angle, speed, transmission gear position, engine speed, throttle position, brake application, suspension position, and a rider override switch, a programmable logic unit controls either a hydraulic cylinder actuator or an electric screw actuator to operate a rotary cam. The cam, when rotated, provides a selected amount of axial slack in the swingarm pivot axle. When slack is present, the swingarm pivot axle is free to move axially and the swingarm member is free to move laterally to a selected degree. The swingarm member's lateral movement is controlled by flexure members, which dictate the force needed for movement. The flexure members are held in place against the pivot ends of the swingarm member by threaded fasteners, which allow for adjustment, as well as allowing for some preloading if desired. The flex characteristics of the flexure members is varied by construction of the flexure members from selected materials, by changing their shape, by adding features, such as apertures, or by construction featuring multiple layers of similar or dissimilar materials. In a first embodiment, the invention is applied to a chassis in which the swingarm member pivots between outboard frame members, and the outboard frame members locate the flexure member mounts.

In a second embodiment, the invention is applied to a chassis in which the swingarm member pivots between outboard frame members and an engine case or a central frame member. In this embodiment, the flexure member mounts may be located in the outboard frame members or on the engine case or central frame member.

In a third embodiment of the invention, the device functions without an actuator and is manually adjusted per rider preference and conditions. This embodiment may be applied to chassis, which use outboard frame members to mount the swingarm member pivot or those that use outboard frame members and an engine case or a central frame member to mount the swingarm member pivot.

In the broadest concept, the mechanism includes a swingarm pivot axle rotatably securing the swingarm member to the frame. A pair of flexure members, each are secured to the frame by a plurality of flexure member mounts, and each include an aperture accepting the swingarm pivot axle. Also present is a means for adjustably controlling the degree of lateral axial deflection of the swingarm pivot axle and associated swingarm member relative to the frame and attached flexure members during operation of the motorcycle.

In one embodiment, the adjustable controlling means includes a cam assembly encircling the swingarm pivot axle. The cam assembly comprising a cam stationary member rigidly secured to the frame and a cam rotating member rotatable by an actuator, the cam members including at least one ramped contact surface there between. An actuator rotates the cam rotating member to provide a variable degree of lateral, axial deflection of the swingarm pivot axle relative to the frame, and each flexure member is positioned to control axial deflection of the swingarm member in one of two opposed directions relative to the frame and attached flexure members during operation of the motorcycle.

In another embodiment, the adjustable controlling means includes a swingarm locking nut member secured to a threaded end of the swingarm pivot axle and securing the swingarm member to the frame. The nut member is adjustable to provide a single, selected degree of lateral, axial deflection of the swingarm pivot axle relative to the frame, and each flexure member is positioned to control lateral, axial deflection of the swingarm member in one of two opposed directions relative to the frame and attached flexure members during operation of the motorcycle.

BRIEF DESCRIPTION OF THE DRAWINGS

FIG. 9 is a section view along line 9—9 of FIG. 6 of a first embodiment of the invention.

FIG. 10 is an enlarged detail view of a portion of FIG. 9 opposite the actuator end of the invention.

FIG. 11 is an enlarged detail view of another portion of FIG. 9 showing the actuator end of the invention.

DESCRIPTION OF THE EMBODIMENTS

Figure 1:
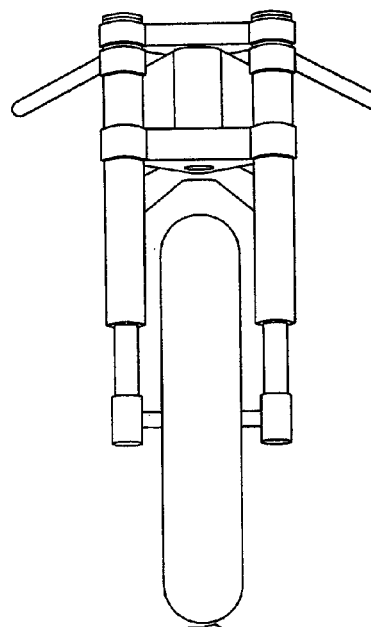
FIG. 1 is a front view of a motorcycle chassis encountering a surface irregularity while in an upright position.
Figure 2:
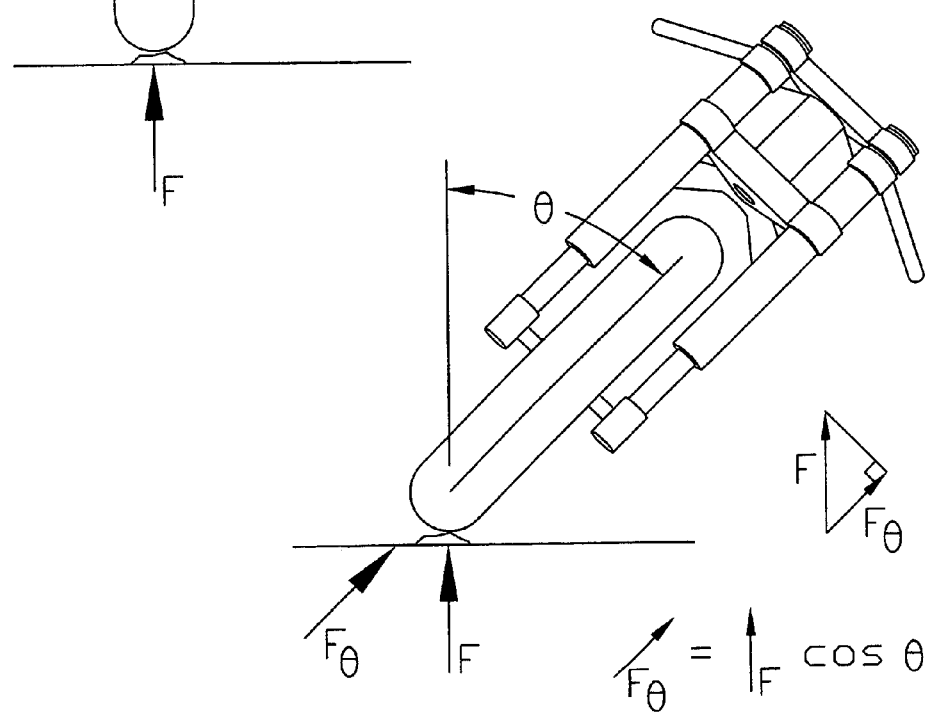
FIG. 2 is a front view of a motorcycle chassis encountering a surface irregularity while in a leaned-over position. An expression of the force available to act on the suspension is included.
Figure 3:
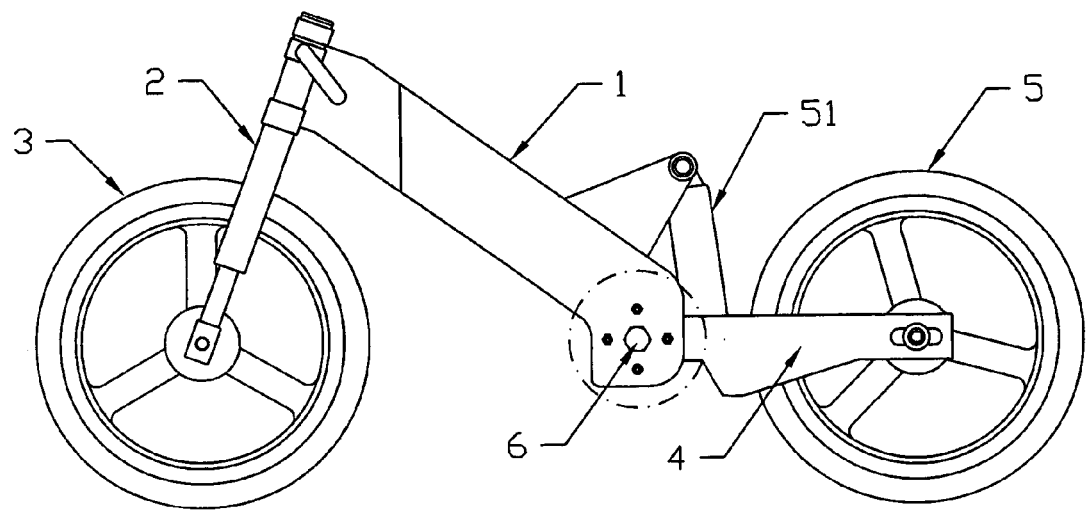
FIG. 3 is a side view of a motorcycle chassis opposite the actuator side of the invention, in a first embodiment of the invention.
Figure 4:
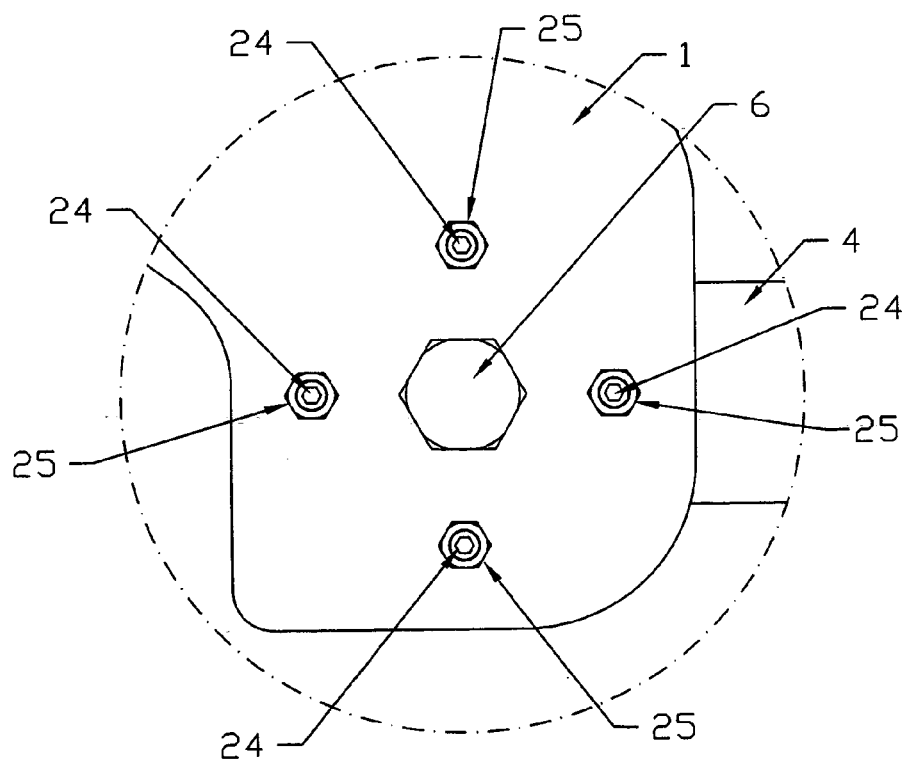
FIG. 4 is an enlarged detail side view of a portion of FIG. 3 opposite the actuator side of the invention, in a first embodiment of the invention.
Figure 5:
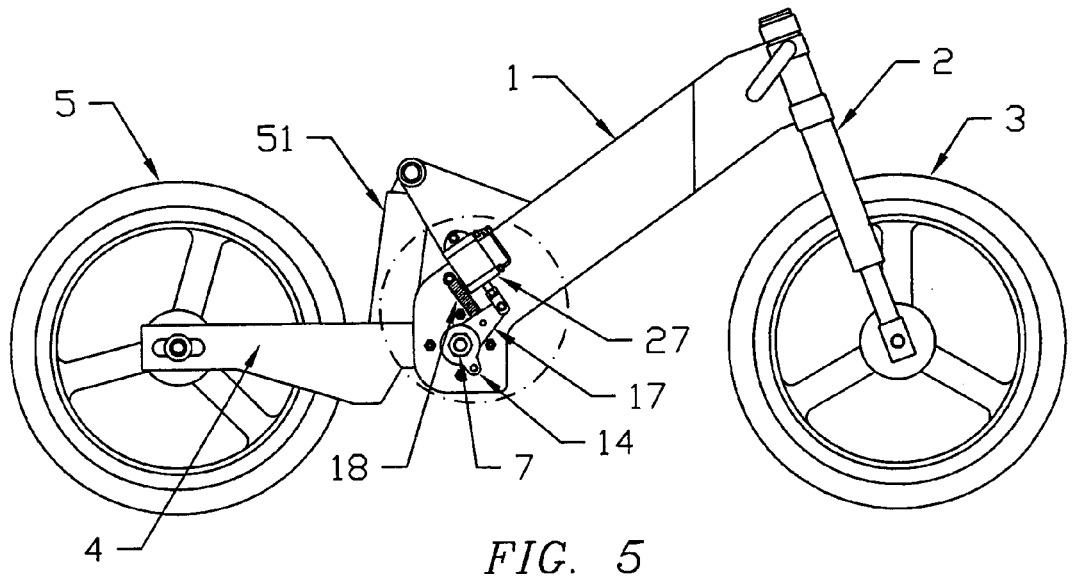
FIG. 5 is a side view of a motorcycle chassis on the actuator side of a first embodiment of the invention, in which the actuator is a hydraulic cylinder.

Nomenclature
 1 Frame
 2 Front Fork
 3 Front Wheel
 4 Swingarm Member
 5 Rear Wheel
 6 Swingarm Pivot Axle
 7 Swingarm Axle Self-locking Nut
 8 Bushing
 9 Needle Bearing
 10 Collar
 11 Thrust Bearing
 12 Engine Case or Central Frame Member
 13 End Cap and Seal
 14 Cam Stationary Member
 15 Cam Fixing Pin
 16 Cam Rotating Member 17 Cam Arm
18 Spring
19 Spring Mounting Pin
20 Cam Arm Joint
21 Cam Thrust Bearing
22 Thrust Collar
23 Flexure Member
24 Threaded Flexure Member Mount
25 Locknut
26 Locknut
27 Hydraulic Cylinder Actuator
28 Electric Screw Actuator
29 Actuator Mount
30 Washer
31 Shoulder
32 Bushing
33 Oil Pump
34 Battery or Power Source
35 Valve
36 Accumulator
37 Mechanism Cam Angle Sensor
38 Lean Angle Sensor
39 Vehicle Speed Sensor
40 Transmission Gear Position Sensor
41 Engine Speed Sensor
42 Throttle Position Sensor
43 Brake Actuation Sensor
44 Suspension Position Sensor
45 Rider Override Switch
46 Logic Unit
47 Reservoir
48 Filter
49 One-way Valve
50 Unloading Valve
51 Suspension Shock Construction Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 3, 5, 7, 14 and 18, the basic structural components of a motorcycle incorporating various embodiments of the invention are illustrated. The structural components include a frame 1 with a front wheel mounted in a front fork 2 secured at one end of the frame 1, and a swingarm member 4 pivotally secured at the opposite end of the frame 1. A rear wheel 5 is mounted to the swingarm member 4 opposite the pivot point thereof. A suspension shock 51 is mounted between the frame and the swingarm member 4 to limit vertical pivoting of the swingarm member 4 and provide a degree of vertical flex to the chassis. The additional components of the motorcycle, such as the motor, transmission and/or drive train, the fuel tank and rider seat are omitted from these five figures for clarity.

The invention is a mechanism that is added to or built into the swingarm pivot of a motorcycle chassis. In a first embodiment of the invention, shown in FIGS. 3 through 13, a swingarm pivot axle 6 is fitted into bushings 8 which are pressed into apertures in the motorcycle frame 1. A concentric shoulder 31 on one end of the swingarm pivot axle 6 provides a close slideable fit into one of the bushings 8. If the motorcycle frame 1 is of suitable construction and material, the swingarm pivot axle 6, optionally, is fitted into apertures in the motorcycle frame 1 without bushings 8. The shoulder 31 end of the swingarm pivot axle 6 includes a hex head, or other feature, to retain the axle 6 to the frame 1, while a self-locking nut 7 is tightened on the opposite end of the axle 6, which is threaded. When installed into the bushings 8, the hex head of the axle 6 is on one outboard side of the frame 1 and the threaded end and self-locking nut 7 is on the other outboard side of the frame 1. On the inboard sides of the frame 1, the swingarm pivot axle 6 passes through flexure members 23, one on each side, and end cap and seals 13, one on each side, which captures the swingarm member 4, best illustrated in FIG. 9.

Figure 6:
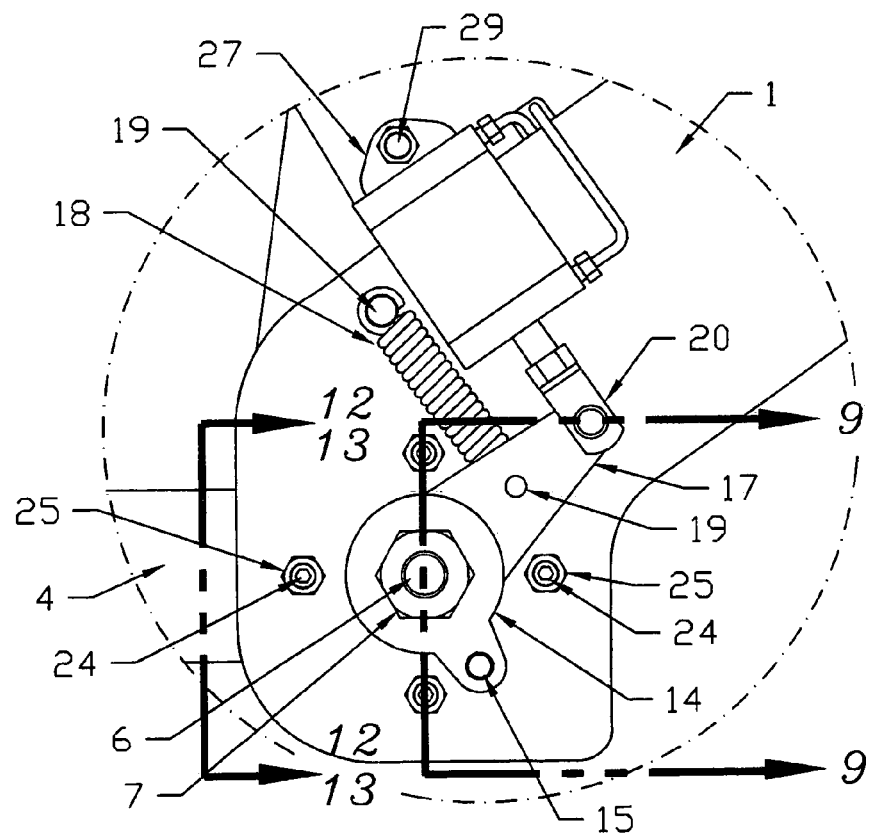
FIG. 6 is an enlarged detail view of a portion of FIG. 5 on the actuator side of a first embodiment of the invention, in which the actuator is a hydraulic cylinder.
Figure 7:
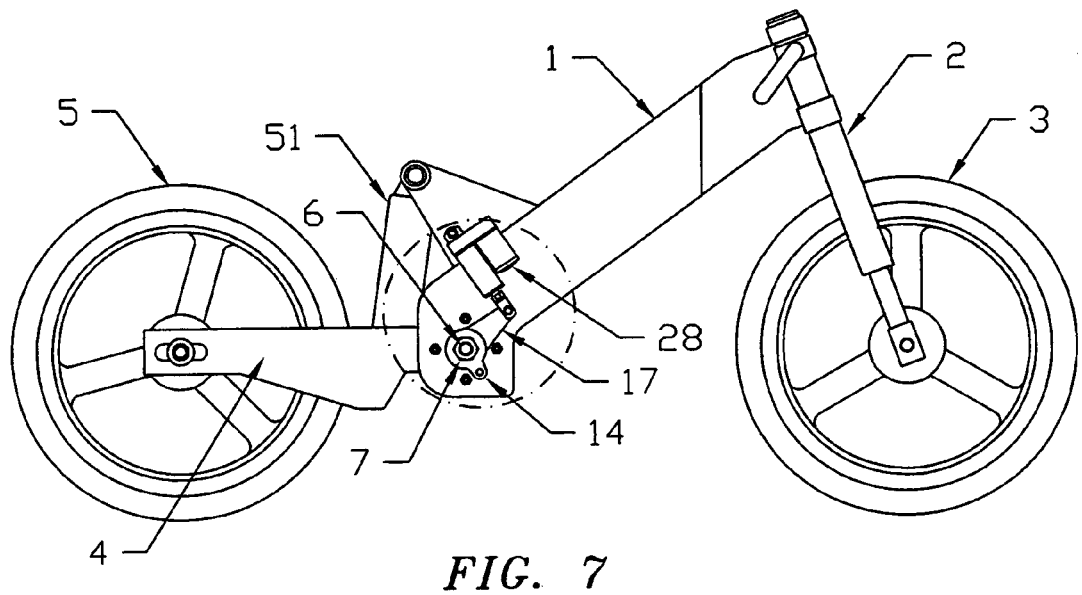
FIG. 7 is a side view of a motorcycle chassis on the actuator side of a first embodiment of the invention, with an electric screw actuator.
Figure 8:
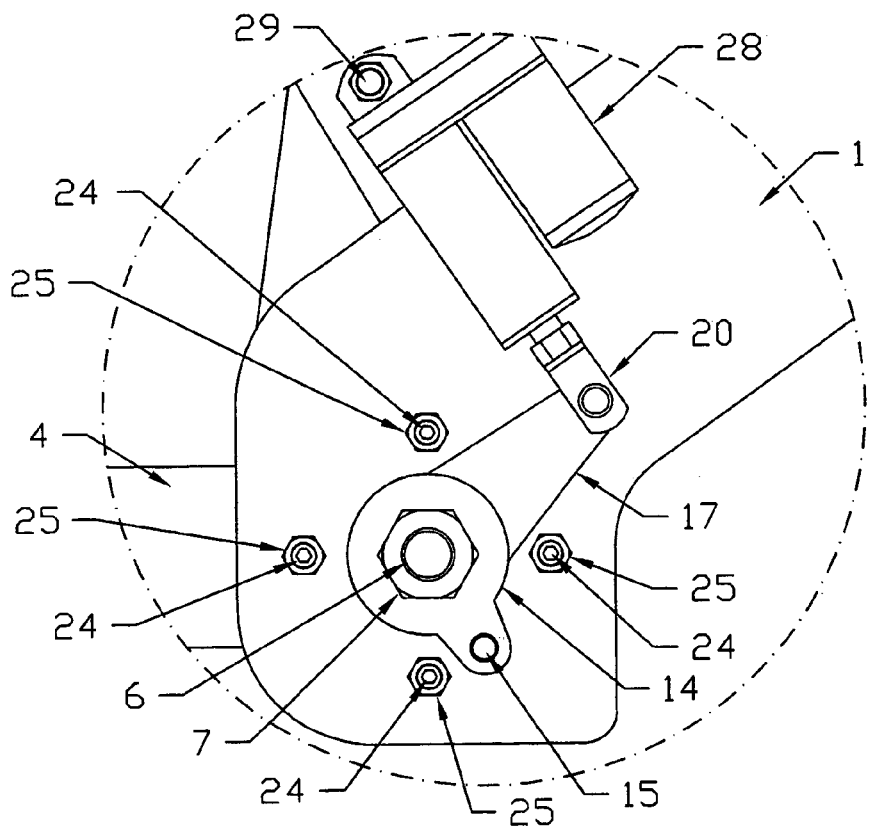
FIG. 8 is an enlarged detail view of a portion of FIG. 7 on the actuator side of a first embodiment of the invention, with an electric screw actuator.

A cam stationary member 14 is slideably fitted to the axle 6 and captured directly behind the self-locking nut 7. The cam stationary member 14 is prevented from rotating by a cam fixing pin 15, which is fixed to the motorcycle frame 1 and extends through an aperture, or other such feature, in the cam stationary member 14. The cam stationary member 14 is acted on by a cam rotating member 16, which is fitted rotatably and slideably to the axle 6 and is registered to the cam stationary member 14. The cam members 14, 16 include at least one ramped contact surface there between. The cam rotating member 16 acts on a cam thrust bearing 21, which in turn, acts on a thrust collar 22. The thrust collar 22 is fitted slideably to the axle 6 and slideably through a bushing 8. A hydraulic cylinder 27 (FIGS. 5 and 6), or an electric screw actuator 28 (FIGS. 7 and 8), is fixed to the motorcycle frame 1 by an actuator mount 29, which comprises a bolt, stud or other such device. The hydraulic cylinder 27, or electric screw actuator 28, is connected pivotally to the cam arm 17 of the cam rotating member 16 by a cam arm joint 20. In the embodiment employing a hydraulic cylinder 27, a spring 18 is preferably fitted between the frame 1 and cam arm 17 by spring mounting pins 19 fixed to the frame 1 and the cam arm 17 (FIG. 6). The spring 18 maintains pressure against the piston seals of the hydraulic cylinder 27. The spring 18 provides a biasing force that tends to return the mechanism to an unoperated state, should there be a loss of fluid or pressure.

A plurality of threaded flexure member mounts 24 are threaded into an array of threaded apertures in both sides of the frame 1 surrounding the swingarm pivot bushings 8. The threaded flexure member mounts 24 feature a stepped end to present a shoulder on which the flexure members 23 mount. The threaded flexure member mounts 24 have internal hex features, or other such features, so that the mounts 24 may be turned to adjust the placement of the flexure members 23 in relation to the end caps and seals 13 fitted to the swingarm member 4. A locknut 25 prevents each threaded flexure member mount 24 from turning in the threaded apertures in the frame 1. Locknuts 26 fasten the flexure members 23 to the threaded flexure member mounts 24. The flexure members 23 are positioned concentrically to the swingarm pivot axle 6 by the threaded flexure member mounts 24. The flexure members 23 each feature a central aperture which is nominally larger than the diameter of the shoulder 31 of the swingarm pivot axle 6, and the outside diameter of the thrust collar 22.

As shown in FIGS. 9, 10, and 11, the swingarm member 4 features needle bearings 9 which are pressed into the swingarm member 4. The needle bearings 9 ride on a collar 10, which fits slideably to the swingarm pivot axle 6. Thrust bearings 11 are fitted to the pivot ends of the swingarm member 4. An end cap and seal 13 is fitted rotatably over each pivot end of the swingarm member 4. A concentrically located aperture in each end cap and seal 13 is nominally larger than the diameter of the axle 6, which passes through the aperture in each end cap and seal 13.

Figure 16:
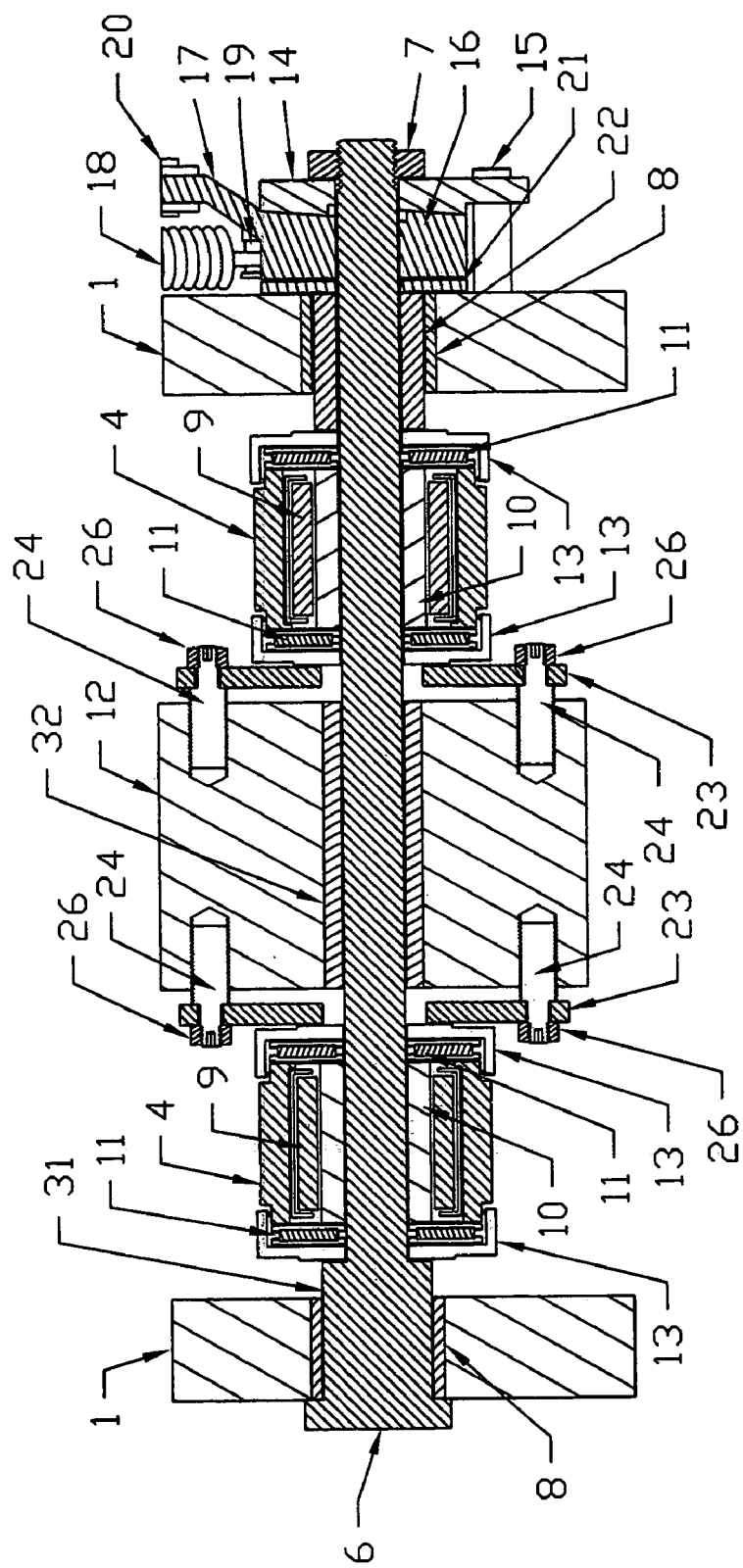
FIG. 16 is a section view along line 16—16 of FIG. 15 of a motorcycle chassis showing a second embodiment of the invention. In this embodiment, in addition to outboard frame members, an engine case or central frame member is used to support the swingarm pivot axle. The engine case or central frame member also locates the flexure member mounts.

In a second embodiment of the invention, shown in FIGS. 14 through 17, an engine case or central frame member 12 is used for additional support to the swingarm member 4 pivot. The swingarm member 4 bearing area is separated so that it straddles the engine case or central frame member 12. Each side of the swingarm member 4 includes a needle bearing 9, a collar 10, two trust bearings 11, and two end caps and seals 13. The swingarm pivot axle 6 passes through bushings 8 in the frame 1 and through a bushing 32 in the engine case or central frame member 12. A plurality of threaded flexure member mounts 24 are threaded into an array of threaded apertures in both sides of the engine case or central frame member 12, as shown in FIG. 16. Flexure members 23 are fastened to the threaded flexure member mounts 24 by locknuts 26 to each side of the case or frame member 12. The threaded flexure member mounts 24 have internal hex features, or other such features, allowing the mounts 24 to be turned to adjust the placement of the flexure members 23 in relation to the end caps and seals 13 fitted to the swingarm member 4. In this embodiment, the two outboard end caps and seals 13 are acted on by the shoulder 31 of the swingarm pivot axle 6 and by the thrust collar 22. The two inboard end caps and seals 13 are acted on by the flexure members 23.

Figure 12:
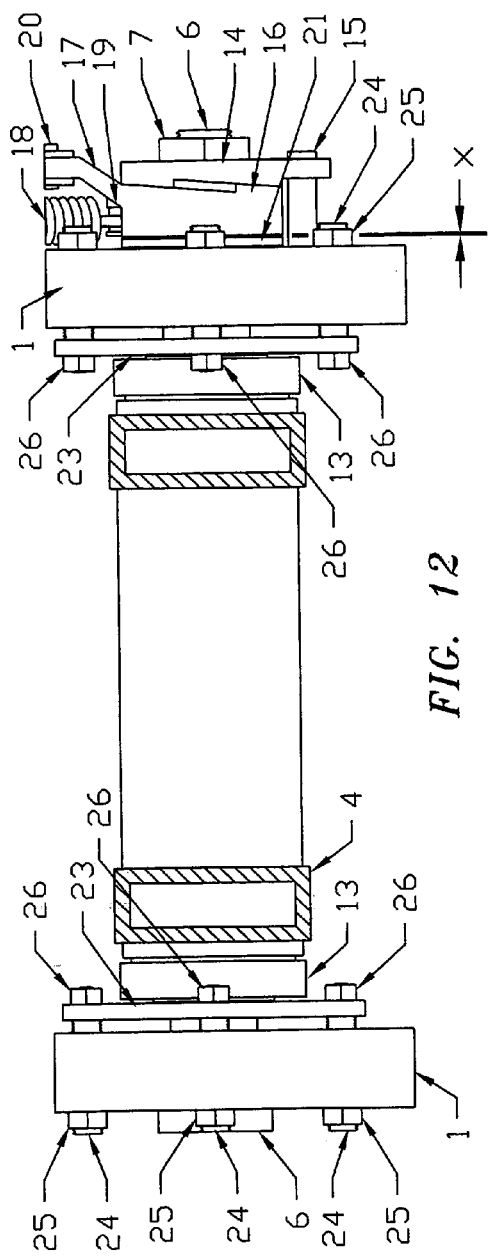
FIG. 12 is an end view from line 12—12 of FIG. 6 of a first embodiment of the invention in an unoperated state. Note that the dimension "X" is essentially zero.
Figure 13:
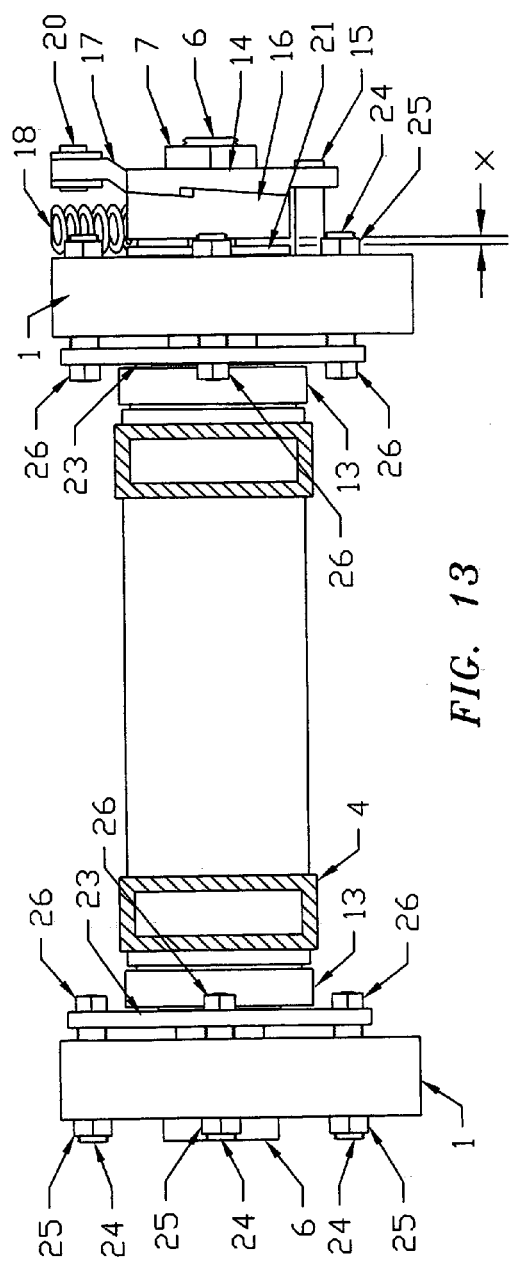
FIG. 13 is an end view from line 13—13 of FIG. 6 of a first embodiment of the invention in an operated state. Note that the dimension "X" is a selected distance dependent upon the amount of cam rotation.
Figure 14:
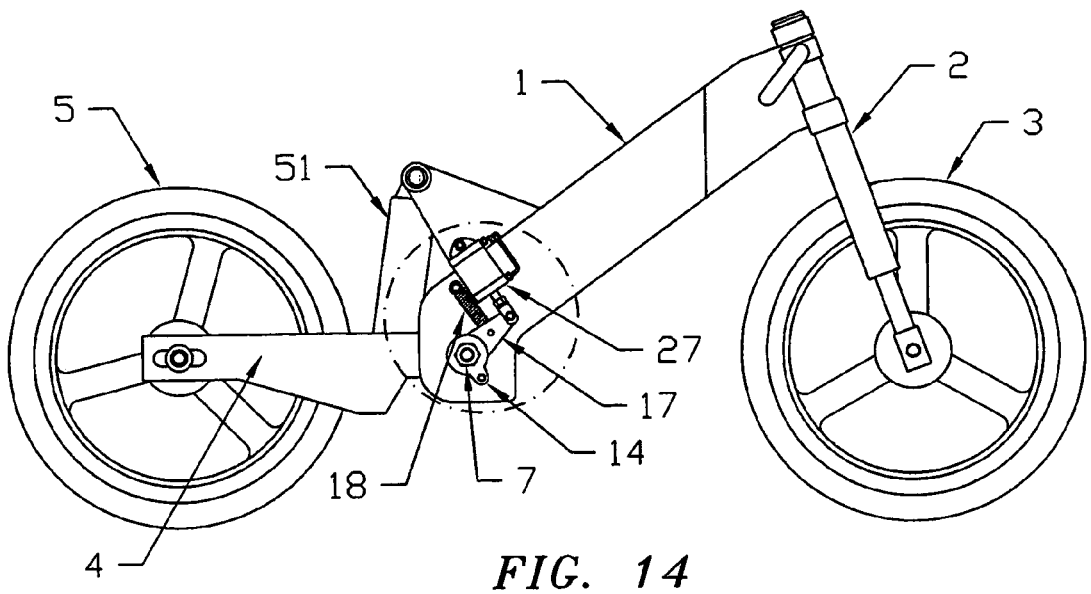
FIG. 14 is a side view of a motorcycle chassis showing a second embodiment of the invention.
Figure 15:
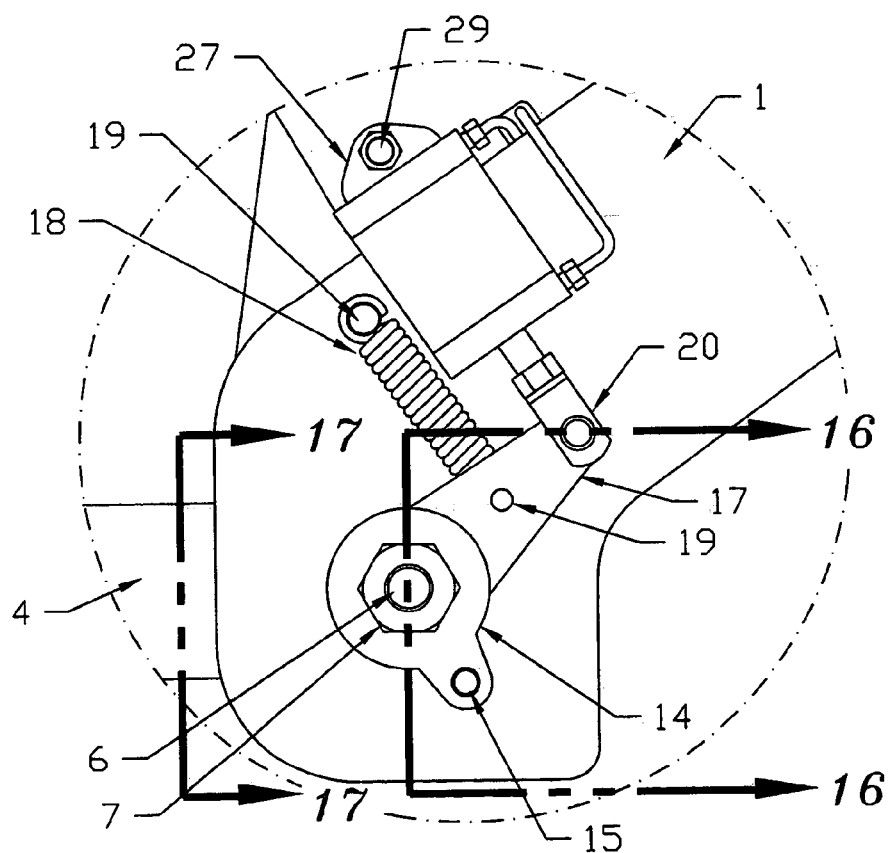
FIG. 15 is an enlarged detail side view of a portion of FIG. 14 showing a second embodiment of the invention.
Figure 17:
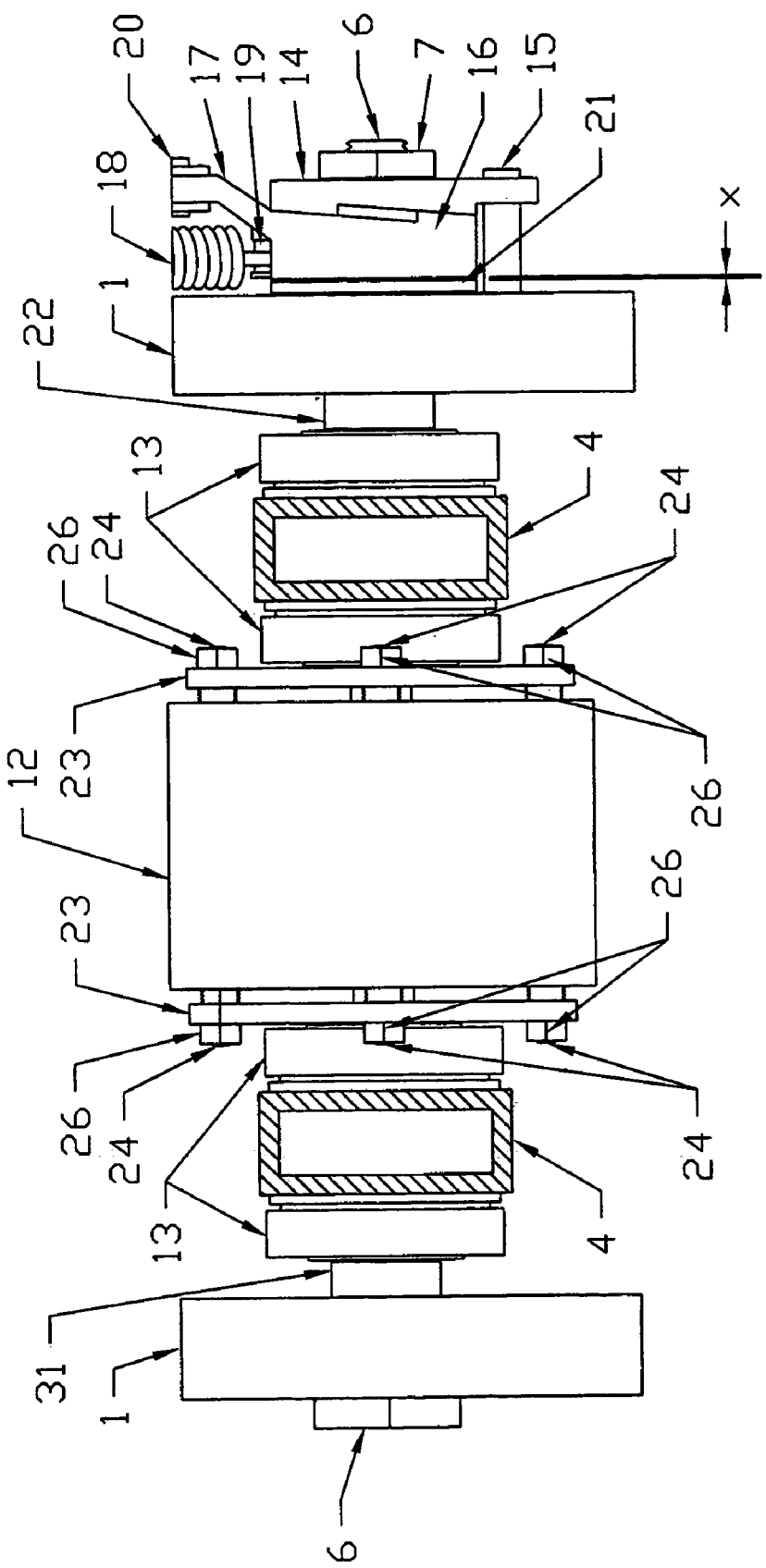
FIG. 17 is an end view from line 17—17 of FIG. 15 of a second embodiment of the invention in an unoperated state. Note that the dimension "X" is essentially zero, and that the dimension increases a selected distance upon rotation of the cam a selected amount.

In the first and second embodiments described above, the mechanism functions as follows: In an unoperated state, no axial play is present in the swingarm member 4 pivot. The pivot axle 6 is held immovably to the frame 1, as illustrated in FIGS. 12 and 17. The swingarm member 4 is held laterally immobile by the shoulder 31 of the swingarm pivot axle 6 on one side, and by the thrust collar 22 on the other side acting on its end caps and seals 13. In this state, the swingarm member 4 can rotate about the swingarm pivot axle 6, but cannot move laterally. When the mechanism is activated, the hydraulic cylinder 27, or electric screw actuator 28, acts on the cam arm 17 to rotate the cam rotating member 16. The cam members 14, 16 include at least one ramped contact surface there between. As the cam rotating member 16 rotates against the cam stationary member 14, the distance between the outside faces of the cam members 14 and 16 decreases. The decrease in distance between the cam members 14 and 16 is the amount of axial play that is introduced into the mechanism, and the swingarm member 4 is free to move axially a corresponding distance. The above described control is illustrated in FIGS. 12, 13, and 17. When axial play is present, the swingarm member 4 is held laterally by the flexure members 23 acting on the end caps and seals 13, which in turn, act on the thrust bearings 11. The flexure members 23 then allow the swingarm member 4 to move laterally if a sufficient lateral force acts on the swingarm member 4. Flex characteristics are adjusted by preloading the flexure members 23, by adjusting the threaded flexure member mounts 24, or by replacing or modifying the flexure members 23. FIGS. 21, 22, 23, and 24 illustrate how the flex characteristics of the flexure members 23 are varied by changing the shape of the flexure members 23, by adding features, such as apertures, or by construction of the flexure members 23 with multiple layers of various materials. The orientation, spacing, and number of threaded flexure member mounts 24 also can be employed to vary the in-place flex characteristics of the flexure members 23.

Further in the first and second embodiments of the invention, the mechanism is controlled by a logic unit 46 (FIGS. 25 and 26) acting on inputs from one or more of the following; a mechanism cam angle sensor 37, a lean angle sensor 38, a vehicle speed sensor 39, a transmission gear position sensor 40, an engine speed sensor 41, a throttle position sensor 42, a brake actuation sensor 43, a suspension position sensor 44, and a rider override switch 45.

Figure 25:
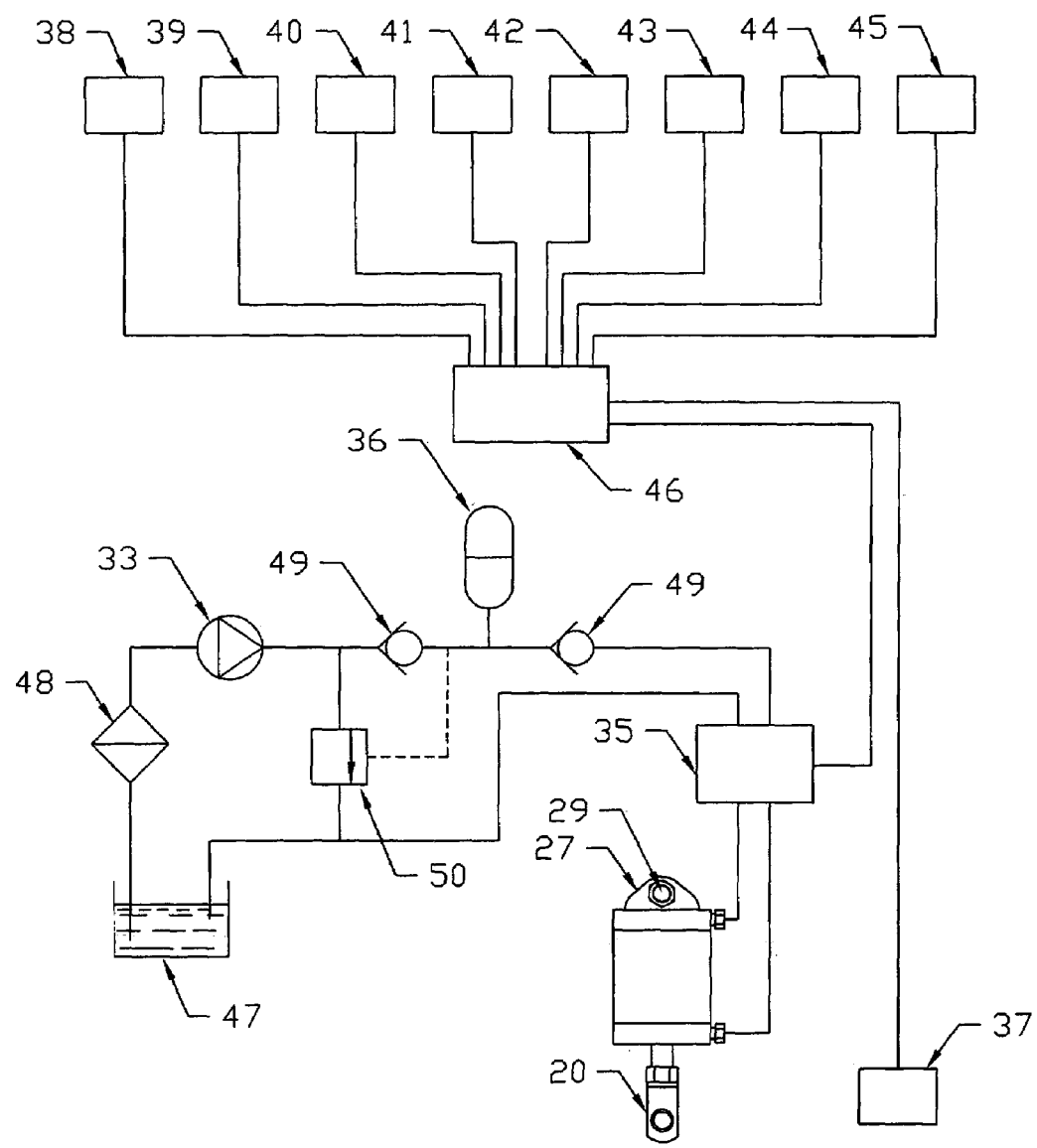
FIG. 25 is a schematic representation of the actuator control system of an embodiment of the invention with hydraulic actuation.

When employing actuation by a hydraulic cylinder 27, as schematically illustrated in FIG. 25, oil, or other suitable media, is pumped from a reservoir 47, through a filter 48, by an oil pump 33, and moves to an accumulator 36, which maintains an appropriate pressure to operate the hydraulic cylinder 27. One-way valves 49 prevent back-flow, and an unloading valve 50 conserves power as it shunts oil from the oil pump 33 to the reservoir 47 once sufficient pressure is attained in the accumulator 36. The logic unit 46, acting on inputs described above, controls a valve 35, which sends oil from the accumulator 36 to the appropriate port of the hydraulic cylinder 27 to operate the cam mechanism. The oil exhausted by the hydraulic cylinder 27 returns to the oil reservoir 47. The hydraulics may be an independent system, or may be part of the motorcycle engine lubrication system.

Figure 26:
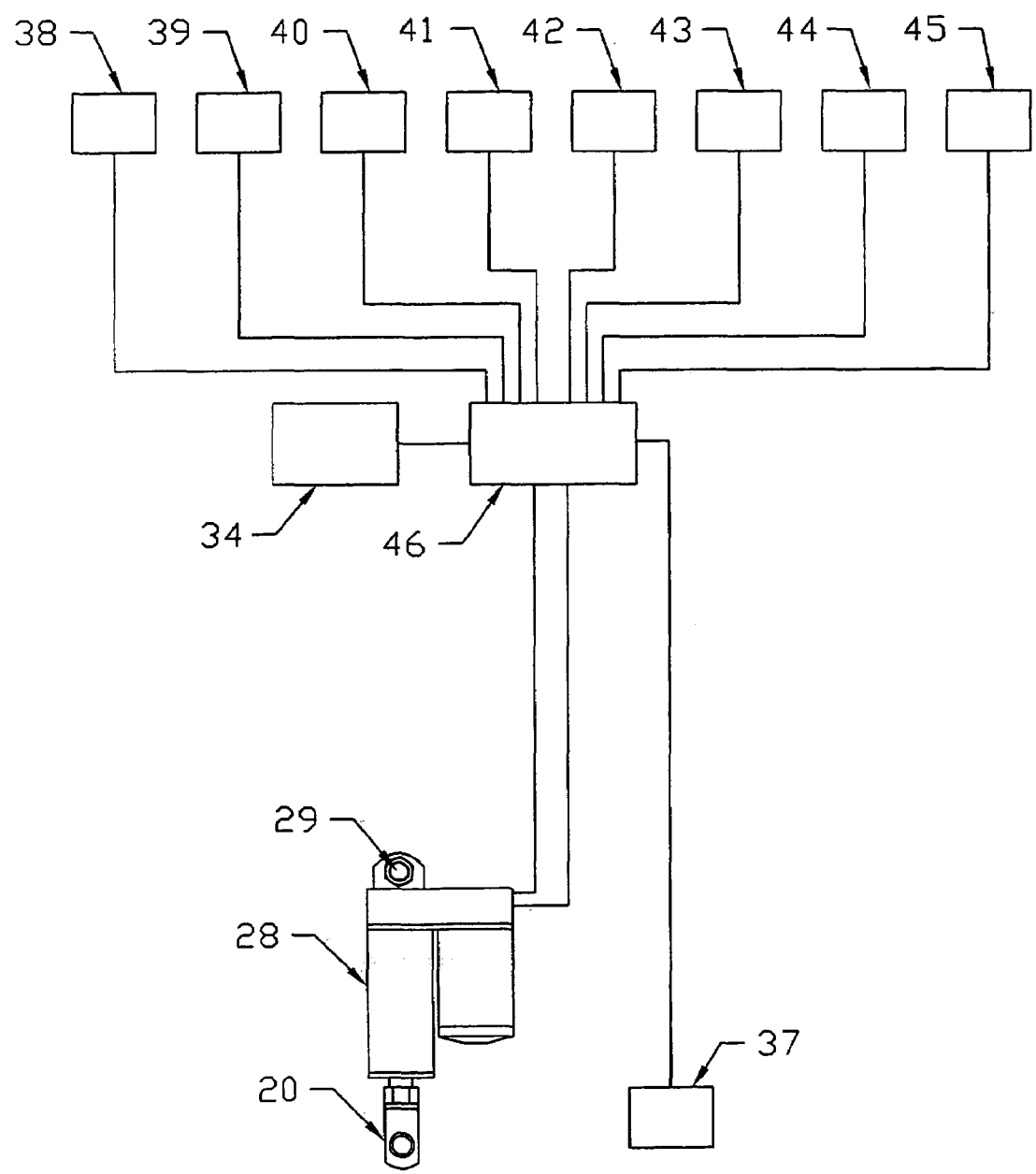
FIG. 26 is a schematic representation of the actuator control system of an embodiment of the invention with screw actuation.

When employing actuation by an electric screw actuator 28, schematically illustrated in FIG. 26, the logic unit 46, acting on one or more inputs as described above, sends power from a battery and/or another electric power source 34 to the appropriate lead of the electric screw actuator 28 to operate the cam mechanism.

In either the case of the hydraulic cylinder actuator 27, or the electric screw actuator 28, the mechanism cam angle sensor 37 provides feedback to the logic unit 46 to verify the position of the cam rotating member 16. The amount of rotation of the cam rotating member 16, and corresponding lateral swingarm member 4 movement, may continuously be varied, per inputs described above, by programming in the logic unit 46. Alternatively, adjustable limit switches (not shown) can be used to set limits for rotation of the cam rotating member 16.

Figure 18:
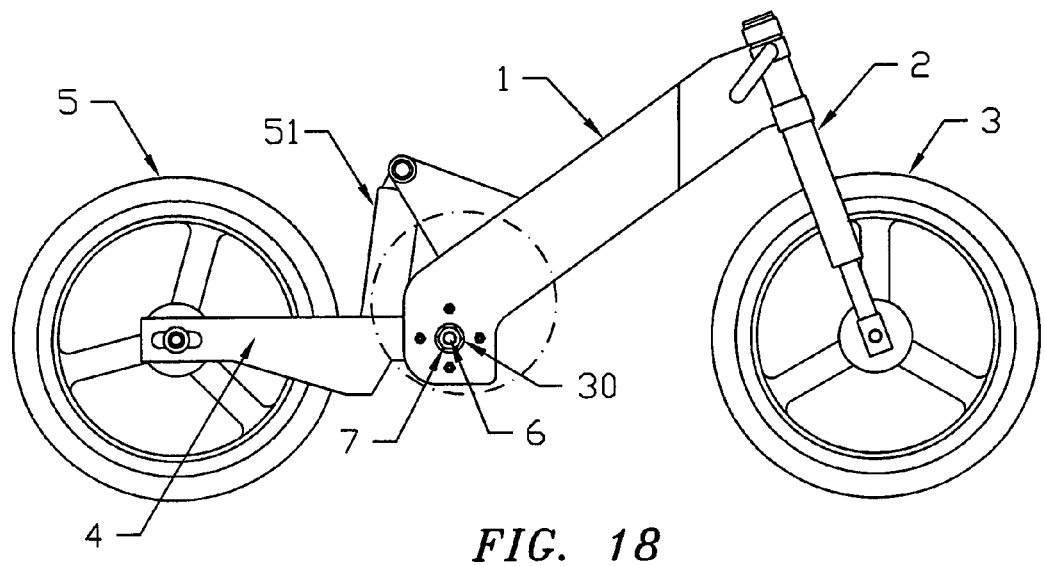
FIG. 18 is a side view of a motorcycle chassis showing a third embodiment of the invention.
Figure 19:
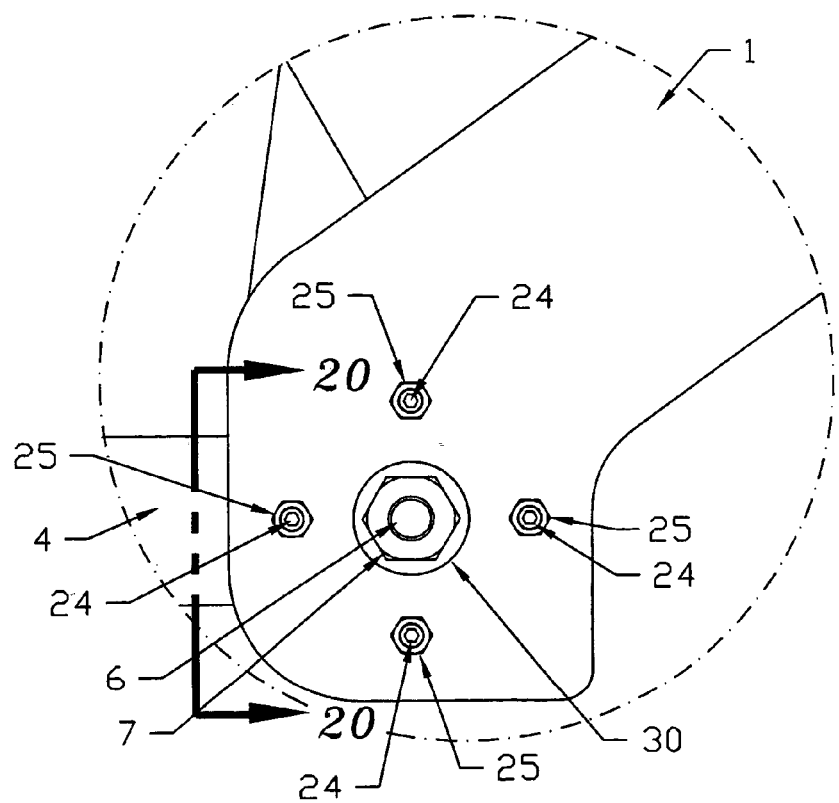
FIG. 19 is an enlarged detail side view of a portion of FIG. 18 showing a third embodiment of the invention.
Figure 20:
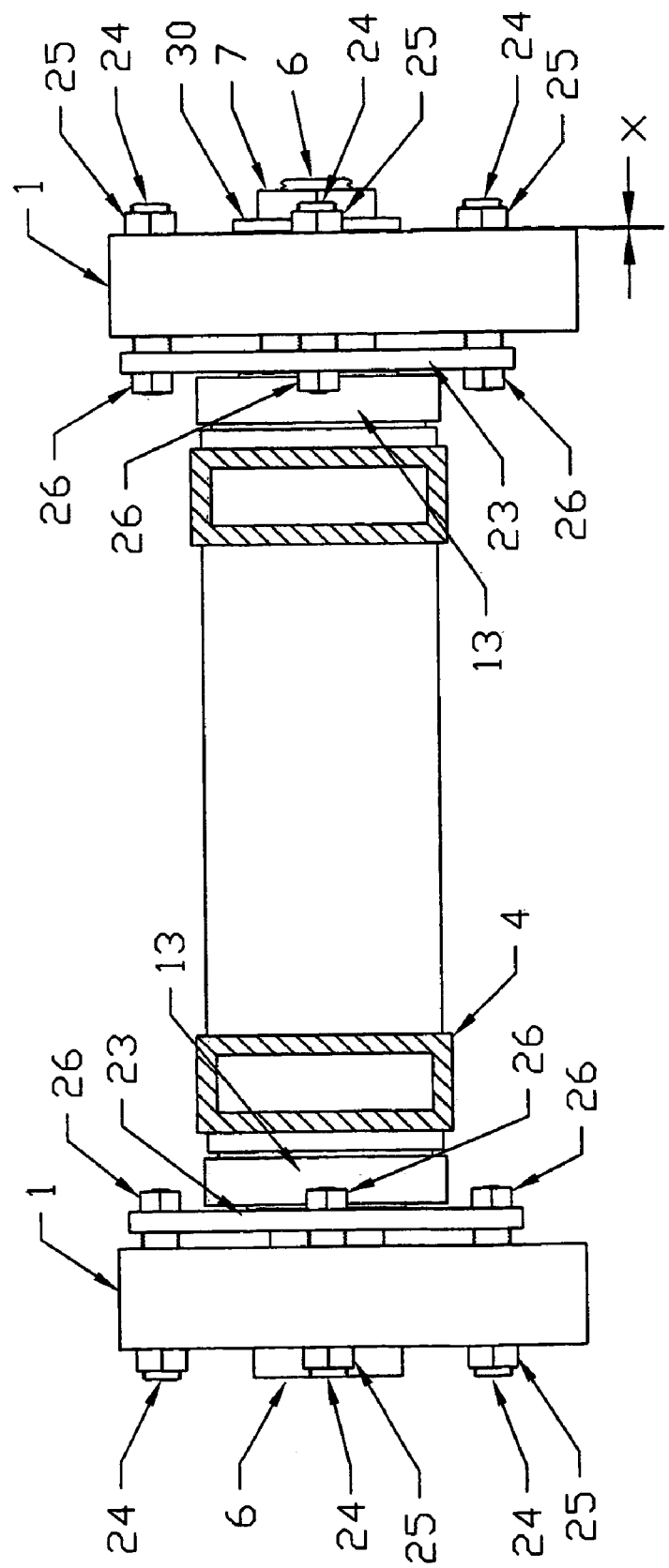
FIG. 20 is an end view from line 20—20 of FIG. 19 of a third embodiment of the invention. Note that the dimension "X" increases as the self-locking nut is loosened.
Figure 21:
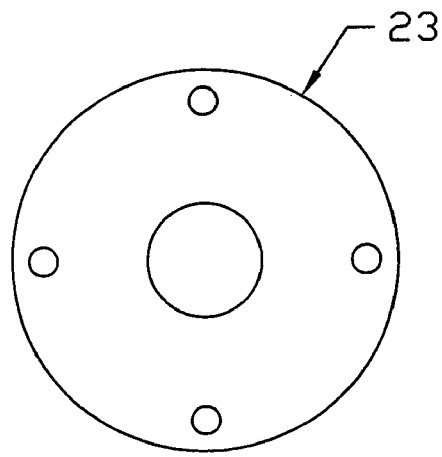
FIG. 21 is a side view of a flexure member.
Figure 22:
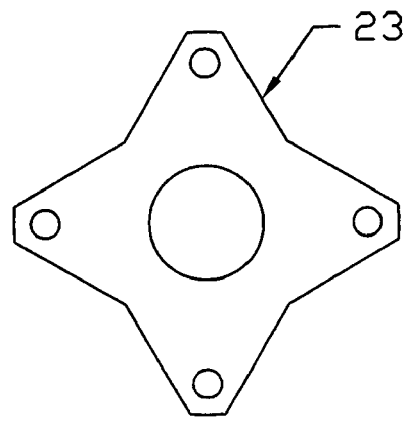
FIG. 22 is a side view of another flexure member illustrating variation in the shape of the flexure member to vary its flex characteristics.
Figure 23:
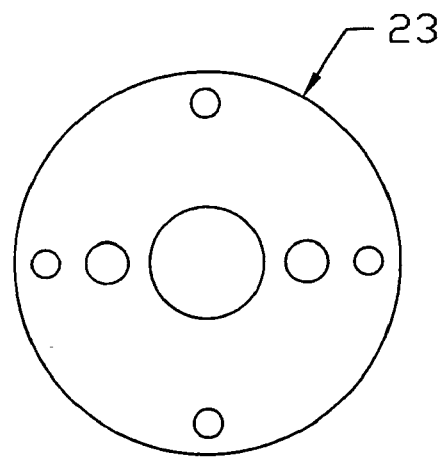
FIG. 23 is a side view of another flexure member illustrating how features, in this case apertures, are added to vary the flex characteristics of the member.
Figure 24:
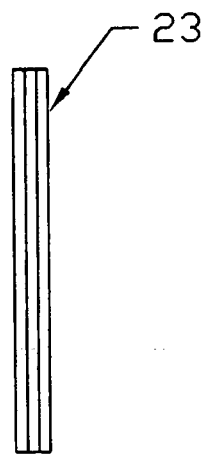
FIG. 24 is an end view of another flexure member illustrating how the member is composed of multiple layers of various materials to vary the flex characteristics of the flexure member.

In a third embodiment of the invention, shown in FIGS. 18, 19, and 20, the mechanism functions without an actuator and is manually adjusted per conditions and rider preference. The stationary and rotating cam members 14 and 16, and the cam thrust bearing 21, are not present in this embodiment. The internal features of the swingarm member pivot 4 are as shown in FIG. 9. A shortened swingarm pivot axle 6, and a washer 30 are put in place. The swingarm axle self-locking nut 7 functions to manually set the desired amount of axial play in the mechanism. Flex characteristics are adjusted by preloading the flexure members 23 by adjusting the threaded flexure member mounts 24, or by replacing or modifying the flexure members. FIGS. 21, 22, 23, and 24 illustrate how the flex characteristics of the flexure members 23 are varied by changing the shape of the flexure members 23, by adding features, such as apertures, or by construction of the flexure members 23 with multiple layers of various materials. The orientation, spacing, and number of threaded flexure member mounts 24 also are used to vary the in-place flex characteristics of the flexure members 23. The third embodiment is applicable to a chassis which uses only outboard frame 1 members to locate the swingarm pivot axle 6 and to chassis which use outboard frame 1 members and an engine case or central frame member 12 to locate the swingarm pivot axle 6.

While the invention has been particularly shown and described with reference to preferred embodiments thereof, it will be understood by those skilled in the art that various changes in form and details may be made therein without departing from the spirit and scope of the invention.

I claim:

1. A mechanism for providing adjustable, controlled flex and lateral suspension movement to a motorcycle chassis with a swingarm member rotatably mounted to a frame, the mechanism including;
   (a) a swingarm pivot axle rotatably securing the swingarm member to the frame;
   (b) a pair of flexure members, each flexure member secured to the frame by a plurality of flexure member mounts, each flexure member including an aperture accepting the swingarm pivot axle; and
   (c) means for adjustably controlling the degree of lateral axial deflection of the swingarm pivot axle and associated swingarm member relative to the frame and attached flexure members during operation of the motorcycle.

2. The mechanism for providing adjustable, controlled flex and lateral suspension movement to a motorcycle chassis of claim 1 wherein, the adjustably controlling means includes a swingarm locking nut member secured to a threaded end of the swingarm pivot axle and securing the swingarm member to the frame, the nut member adjustable to provide a single, selected degree of lateral, axial deflection of the swingarm pivot axle relative to the frame, and each flexure member positioned to control lateral, axial deflection of the swingarm member in one of two opposed directions relative to the frame and attached flexure members during operation of the motorcycle.

3. The mechanism for providing adjustable, controlled flex and lateral suspension movement to a motorcycle chassis of claim 2 wherein, the flex characteristics of the pair of flexure members determines the degree of lateral, axial deflection of the swingarm member relative to the frame.

4. The mechanism for providing adjustable, controlled flex and lateral suspension movement to a motorcycle chassis of claim 1 wherein, each flexure member is mounted to an outboard frame portion to accept the swingarm pivot axle.

5. The mechanism for providing adjustable, controlled flex and lateral suspension movement to a motorcycle chassis of claim 1 wherein, each flexure member is mounted to a central frame portion to accept the swingarm pivot axle.

6. The mechanism for providing adjustable, controlled flex and lateral suspension movement to a motorcycle chassis of claim 1 wherein, the adjustably controlling means includes a cam assembly encircling the swingarm pivot axle, the cam assembly comprising a cam stationary member rigidly secured to the frame and a cam rotating member rotatable by an actuator, the cam members including at least one ramped contact surface there between, the actuator rotating the cam rotating member to proved a variable degree of lateral, axial deflection of the swingarm pivot axle relative to the frame, and each flexure member positioned to control axial deflection of the swingarm member in one of two opposed directions relative to the frame and attached flexure members during operation of the motorcycle.

7. The mechanism for providing adjustable, controlled flex and lateral suspension movement to a motorcycle chassis of claim 6 wherein, the flex characteristics of the pair of flexure members determines the degree of lateral, axial deflection of the swingarm member relative to the frame.

8. The mechanism for providing adjustable, controlled flex and lateral suspension movement to a motorcycle chassis of claim 6 wherein, the actuator is a hydraulic cylinder device.

9. The mechanism for providing adjustable, controlled flex and lateral suspension movement to a motorcycle chassis of claim 6 wherein, the actuator is an electric screw device.

10. The mechanism for providing adjustable, controlled flex and lateral suspension movement to a motorcycle chassis of claim 6, further including an actuator control system providing control of the rotation of the cam rotating member by the actuator, the actuator control system including a logic unit receiving input from at least one sensor member, the at least one sensor member input, via the logic unit, producing an actuator control signal causing the actuator to varying the degree of lateral axial deflection of the swingarm pivot axle relative to the frame, and each flexure member positioned to control axial deflection of the swingarm member in one of two opposed directions relative to the frame and attached flexure members during operation of the motorcycle.

11. The mechanism for providing adjustable, controlled flex and lateral suspension movement to a motorcycle chassis of claim 10 wherein, the at least one sensor member is selected from the group, a mechanism cam angle sensor, a lean angle sensor, a vehicle speed sensor, a transmission gear position sensor, an engine speed sensor, a throttle position sensor, a brake actuation sensor, a suspension position sensor, and a rider override switch.

12. A mechanism for providing adjustable, controlled flex and lateral suspension movement to a motorcycle chassis with a swingarm member rotatably mounted to a frame, the mechanism including;
   (a) a swingarm pivot axle rotatably securing the swingarm member to the frame;
   (b) a pair of flexure members, each flexure member secured to the frame by a plurality of flexure member mounts, each flexure member including an aperture accepting the swingarm pivot axle; and
   (c) a swingarm locking nut member secured to a threaded end of the swingarm pivot axle and securing the swingarm member to the frame, the nut member adjustable to provide a single, selected degree of lateral, axial deflection of the swingarm pivot axle relative to the frame, each flexure member positioned to control lateral, axial deflection of the swingarm member in one of two opposed directions relative to the frame and attached flexure members during operation of the motorcycle.

13. The mechanism for providing adjustable, controlled flex and lateral suspension movement to a motorcycle chassis of claim 12 wherein, the flex characteristics of the pair of flexure members determines the degree of lateral, axial deflection of the swingarm member relative to the frame.

14. The mechanism for providing adjustable, controlled flex and lateral suspension movement to a motorcycle chassis of claim 12 wherein, each flexure member is mounted to an outboard frame portion to accept the swingarm pivot axle.

15. The mechanism for providing adjustable, controlled flex and lateral suspension movement to a motorcycle chassis of claim 12 wherein, each flexure member is mounted to a central frame portion to accept the swingarm pivot axle.

16. A mechanism for providing adjustable, controlled flex and lateral suspension movement to a motorcycle chassis with a swingarm member rotatably mounted to a frame, the mechanism including;

(a) a swingarm pivot axle rotatably securing the swingarm member to the frame;
(b) a pair of flexure members, each flexure member secured to the frame by a plurality of flexure member mounts, each flexure member including an aperture accepting the swingarm pivot axle; and
(c) a cam assembly encircling the swingarm pivot axle, the cam assembly comprising a cam stationary member rigidly secured to the frame and a cam rotating member rotatable by an actuator, the cam members including at least one ramped contact surface there between, the actuator rotating the cam rotating member to proved a variable degree of lateral, axial deflection of the swingarm pivot axle relative to the frame, and each flexure member positioned to control axial deflection of the swingarm member in one of two opposed directions relative to the frame and attached flexure members during operation of the motorcycle.

17. The mechanism for providing adjustable, controlled flex and lateral suspension movement to a motorcycle chassis of claim 16 wherein, the flex characteristics of the pair of flexure members determines the degree of lateral, axial deflection of the swingarm member relative to the frame.

18. The mechanism for providing adjustable, controlled flex and lateral suspension movement to a motorcycle chassis of claim 16 wherein, the actuator is a hydraulic cylinder device.

19. The mechanism for providing adjustable, controlled flex and lateral suspension movement to a motorcycle chassis of claim 16 wherein, the actuator is an electric screw device.

20. The mechanism for providing adjustable, controlled flex and lateral suspension movement to a motorcycle chassis of claim 16, further including an actuator control system providing control of the rotation of the cam rotating member by the actuator, the actuator control system including a logic unit receiving input from at least one sensor member, the at least one sensor member input, via the logic unit, producing an actuator control signal causing the actuator to varying the degree of lateral axial deflection of the swingarm pivot axle relative to the frame, and each flexure member positioned to control axial deflection of the swingarm member in one of two opposed directions relative to the frame and attached flexure members during operation of the motorcycle.

21. The mechanism for providing adjustable, controlled flex and lateral suspension movement to a motorcycle chassis of claim 20 wherein, the at least one sensor member is selected from the group, a mechanism cam angle sensor, a lean angle sensor, a vehicle speed sensor, a transmission gear position sensor, an engine speed sensor, a throttle position sensor, a brake actuation sensor, a suspension position sensor, and a rider override switch.

* * * * *